United States Patent [19]
Orain

[11] 3,792,603
[45] Feb. 19, 1974

[54] APPARATUS FOR ASSEMBLING TWO PARTS INTO INTERLOCKED AND INTERFITTING RELATIONSHIP

[75] Inventor: Michel Orain, Courbevoie, France

[73] Assignee: Societe Anonyme: Glaenzer Spicer, Poissy, France

[22] Filed: July 26, 1972

[21] Appl. No.: 275,288

Related U.S. Application Data

[63] Continuation of Ser. No. 833,373, June 16, 1969, abandoned.

[52] U.S. Cl.................... 72/402, 29/517, 72/410, 72/416, 72/474
[51] Int. Cl............................ B21d 41/00, B21j 7/16
[58] Field of Search . 72/357, 402, 452 X, 410, 426, 72/474; 29/517

[56] References Cited
UNITED STATES PATENTS
| | | | |
|---|---|---|---|
| 3,052,276 | 9/1962 | Bender.................................. | 72/474 |
| 3,455,140 | 7/1969 | Galan et al. .......................... | 72/402 |
| 3,514,843 | 6/1970 | Cernik .............................. | 72/402 X |

FOREIGN PATENTS OR APPLICATIONS
| | | | |
|---|---|---|---|
| 944,378 | 12/1963 | Great Britain.......................... | 72/40 |
| 970,064 | 9/1964 | Great Britain........................ | 72/402 |
| 1,400,424 | 4/1965 | France................................. | 72/402 |

*Primary Examiner*—Charlie T. Moon
*Attorney, Agent, or Firm*—Baldwin, Wight & Brown

[57] ABSTRACT

The present invention relates to a process consisting essentially, for permanently assembling an outer tubular part, or a part comprising a tubular portion and an inner part having a grooved profile, and of greater hardness than the outer part, in carrying out a strong radial clamping, by means of an hydraulic or other type of press, simultaneously on at least a large portion of the periphery of the said outer part by means of a tool capable of carrying out the said radial clamping in accordance with at least three equidistant radii and comprising at least three members exerting thrusts directed towards the longitudinal axis common to both parts, by means of the press and on at least one of said members so as to plastically deform the said outer part by swaging and by inserting in the bore thereof the grooves of the inner part positioned on either side of the thrust lines.

6 Claims, 17 Drawing Figures

PATENTED FEB 19 1974 3,792,603
SHEET 1 OF 4
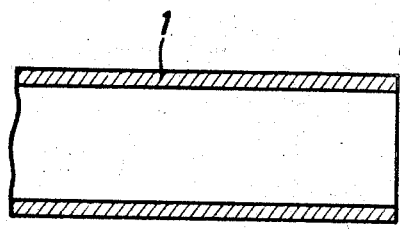
FIG. 1
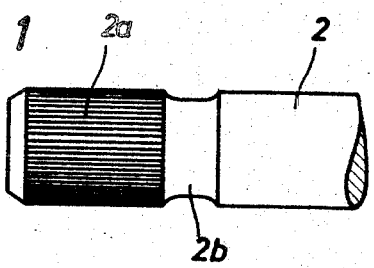
FIG. 2
FIG. 3
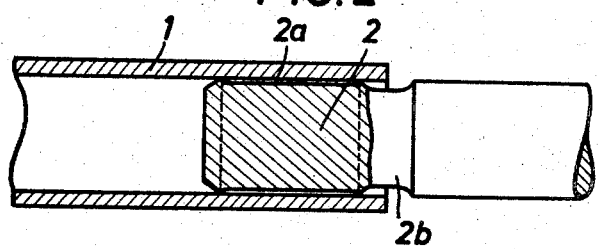
FIG. 4
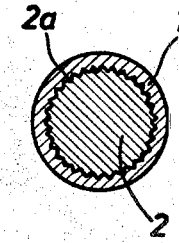
FIG. 5
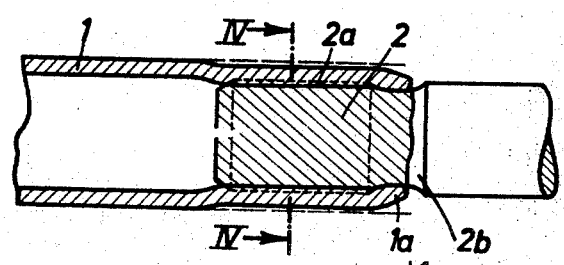
Inventor:
Michel Orain
By Baldwin Wight Diller & Brown
Attorneys

APPARATUS FOR ASSEMBLING TWO PARTS INTO INTERLOCKED AND INTERFITTING RELATIONSHIP

This is a continuation of application Ser. No. 833,373, filed June 16, 1969, now abandoned.

The present invention relates to a process for the groove assembly of rotary parts and a tool for carrying out this process.

The use of grooves is very widespread in all mechanical applications to secure two parts in rotation which are adapted to transmit a torque.

Two sorts of groove assemblies can be distinguished:

a. stationary assemblies wherein the two parts to be coupled are relatively axially immovable during use;
b. sliding assemblies which, in addition to blocking during rotation, provide the possibility of relative axial movement of the parts.

In applications of the first type of groove assembly, a large number of examples are known wherein, once this joint has been effected, it does not have to be taken apart. It is this type of joint, rendered permanent by grooves, which is the object of the present application.

Joining by fixed grooves as carried out by known means usually necessitates:

cutting or rolling grooves on the periphery of the shaft (or the inner part) to exact indications with respect to shape, size and diameter;

inner cutting of the tubular part corresponding to that of the shaft, and generally obtained by broaching to exact shape and dimensions;

an axial stop device such as a shoulder, O-ring, nut etc..., to stop axial sliding which would entail destruction of the assembly.

Carrying out this type of assembly by the means usually used has the following drawbacks:

1. Mass production requires large, expensive machines, groove rolling and broaching machines in which costly, fragile tools are used which require care and attention.

2. The profiles of the grooves to be formed on the inner and outer parts and the sizes on the sides of these grooves should correspond very closely so that it is possible to mount them and that play should be reduced, all of which often necessitates the inner and outer parts of these parts being individually fitted and checked.

3. As clearance, however slight, exists in these assemblies, the connecting surfaces often suffer from the phenomenon of contact corrosion. Moreover, this clearance, even if it is very slight in new couplings, may increase following battering due to knocking occurring when the torque transmitted is reversed, or flexion moments are applied to the assembly.

4. Axial fixing or retention of the two parts coupled necessitates an O-ring or other stop means being used, which involves machining and weakens the shaft to be assembled.

A second known method consists in carrying out cutting solely on the periphery of the shaft and, after tempering, the shaft is force fitted into a bore formed in the other part. This method necessitates the bored part having a wall of sufficient thickness so at the teeth of the shaft can from slightly marked grooves in the bore; if the outer part is no thick it dilates when the shaft is press fitted and grooves, are not formed in the bore, and therefore efficient coupling is not achieved.

Another drawback of this method is that the assembly is axially retained only by friction, which is not possible for all applications.

The aim of the invention is to provide a process permitting an axially fixed groove assembly to be carried out and which does not possess the above-mentioned drawbacks.

The process which is the object of the invention consists essentially, for permenently assembling an outer tubular part, or a part comprising a tubular portion and an inner part having a grooved profile, and of greater hardness than the outer part, in carrying out a strong radial clamping, by means of an hydraulic or other type of press, simultaneously on at least a large portion of the periphery of the said outer part by means of a tool capable of carrying out the said radial clamping in accordance with at least three equidistant radii and comprising at least three members exerting thrusts directed towards the longitudinal axis common to both parts, by means of the press and on at least one of said members so as to plastically deform the said outer part by swaging and by inserting in the bore thereof the grooves of the inner part positioned on either side of the thrust lines.

The grooves of the part or portion of the inner part can be disposed in any manner and have a profile of very diverse shapes.

The tool for putting the process of the invention into effect comprises at least three members in the form of a jaw each having a smooth, concave inner surface of circular cross-section and which, after assembly of the jaws, can be joined to the inner surfaces of the contiguous jaws to form a composite circular bore having the axis of the parts to be assembled as a center, each of the jaws having a generally hexagonal cross-section in which the two sides, situated on either side of the concave side constituting a portion of said bore, are radial with respect to said center and at least one of them is adapted to contact an intermediate member secured to the press slide, and the other sides are adapted to contact guide parts with sloping planes, V-shaped for instance, capable of directing each jaw radially towards the said center.

The elements of the tool can consist of four jaws having smooth inner surfaces coacting with two blocks each having a V-shaped notch in which the jaws are engaged in pairs.

The invention is described in greater detail hereinafter with reference to the appended drawings in which:

FIG. 1 shows two parts to be assembled;
FIG. 2 shows a first assembling step;
FIG. 3 represents the parts after assembling carried out according to the invention;
FIG. 4 is a cross-section along line IV—IV of FIG. 3;

FIG. 5 represents the parts to be assembled ready to undergo the assembling step by means of a tool comprising three jaws.

The process which is the object of the invention can be used for assembling a tubular part, or a tubular portion of any part and another part provided with grooves of any shape and arrangement.

FIGS. 1 to 4 show, as a simple example, an assembly obtained, according to said process, by joining a tubular part 1 to a shaft 2 provided with grooves $2_a$ on the and thereof the axis of which is parallel to that of the shaft.

FIG. 1 shows the two parts separated, FIG. 2 represents shaft 2 being fitted into the outer, tubular part 1, and FIG. 3 shows them after their being assembled in accordance with the aforesaid process.

It is advantageous to cause end $1_a$ of tubular part 1 to extend beyond the begining of grooves $2_a$ of shaft 2 and to provide the latter with a circular groove $2_b$ into which the said end $1_a$ can be pushed back. This enables the region of the grooves to be sealed and the assembly to be strengthened by forming a continuous ring without grooves, and therefore strong, and relieved of all stresses.

According to the invention, the plastic radial reduction of the outer part 1 on shaft 2 provided with previously tempered grooves $2_a$ is obtained by means of a tool having three or four swage members.

Figure 6:
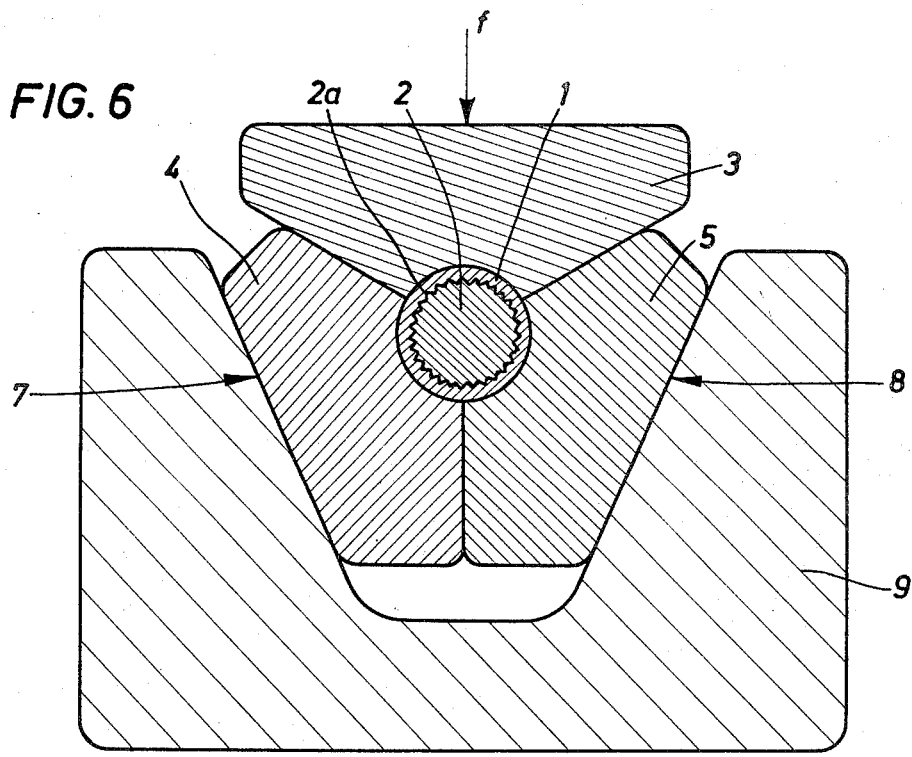
FIG. 6 represents the parts after the assembling step.

FIGS. 5 and 6 show a first form of embodiment of this tool wherein the said members consist of 3 smooth jaws 3, 4 and 5. The upper jaw 3 can be mounted directly onto the piston of the press and moves in the direction of arrow f, whereas the two lower jaws 4 and 5 can move and be activated at angles of 120° on either side of the vertical axis by sliding along slopes 7 and 8 formed in separate blocks or more advantageously, in a single block 9, machined to a V-shape and secured to the press table. The angle alpha formed by slopes 7 and 8 with the vertical axis is less than 30° to ensure the same radial stress on all three jaws, taking the sliding friction into account.

A very great radial pressure, necessary for and sufficient to cause the wall of tubular part 1 to flow and take the shape of the profile of grooves $2_a$ formed in shaft 2, can thus be exerted simultaneously about the entire periphery of the said part 1 in a simple, economical manner.

Figure 7:
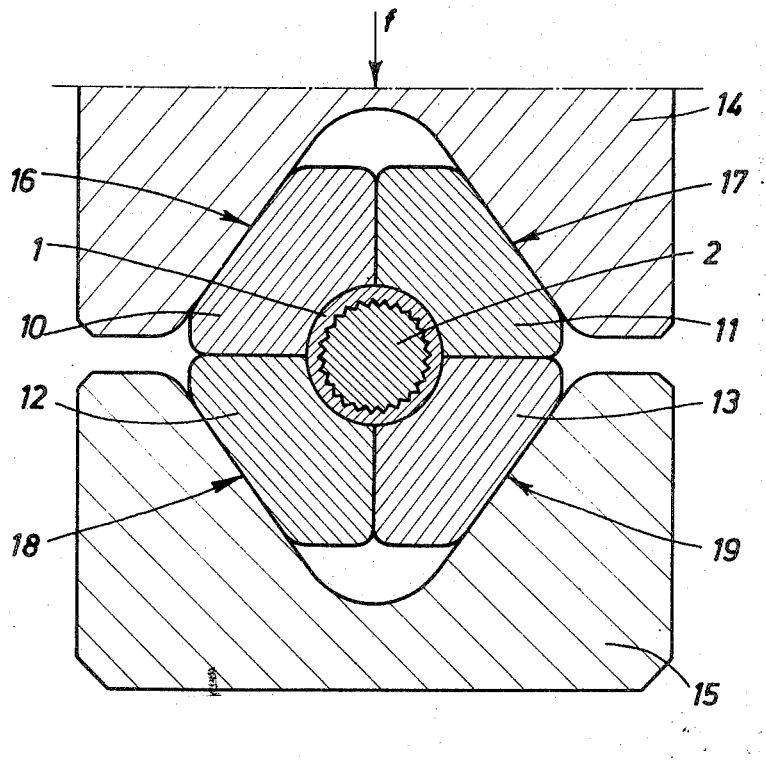
FIG. 7 shows two parts assembled by means of a tool comprising four jaws.

In the form of embodiment shown in FIG. 7, the swage members consist of four jaws 10, 11, 12 and 13 positioned between two blocks 14 and 15, machined to a V-shape to form slopes 16, 17, 18 and 19 on which the jaws can slide. The upper block 14 is subjected to the thrust of the piston of the press whereas the lower block 15 is positioned on the table of the press.

It is, of course, possible to increase the number of jaws, but this increase in the number of members provides no additional advantage.

Figure 8:
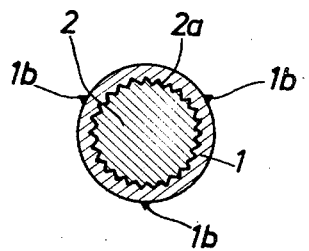
FIG. 8 represents an assembly carried out by means of a tool comprising three jaws.

Tubular workpiece 1 may have residual flashes $1_b$ on the outer surface thereof (FIG. 8) corresponding to the joint lines of the three jaws, which, in the case being considered, correspond to this mode of embodiment shown in FIG. 7. In order to eliminate these flashes, it is only necessary to carry out a second pressing after having angularly moved the assembly.

Figure 9:
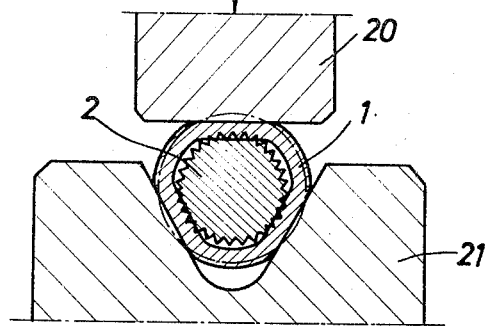
FIG. 9 represents a tool having three swage points.

However, in accordance with the invention, these flashes however small, may be completely eliminated by forming the same number of flat surfaces on the surface of the tubular workpiece as the number of jaws contained in the tool. FIG. 9 shows a special tool mounted on the press and comprising a punch 20 with a planar surface and a block with a V-shaped cut-out section which enables these planar portions to be formed when the reducing tool comprises three jaws. In the case of a tool comprising four jaws, another block including a V-shaped jag replaces punch 20 and is mounted on the slide or piston of the press.

During assembling by swaging on the grooved shaft 2, it is obviously necessary to secure the planar surface formed on tubular part 1 in line with the joint lines of the jaws.

The advantages of the assembly according to the invention are easily seen:

a. The broaching machine usually used for conventional assemblies is replaced by a press which is much cheaper and which permits much higher levels of production. The forming tools are much cheaper and there are no maintenance costs;

b. while avoiding the adjustments necessary for machines for groove rolling, and fitting the parts to be assembled, the couplings according to the invention are easily carried out by non-specialised personnel;

c. the assembly thus formed has no radial, torsional or axial play and, as it remains under radial stress, its behaviour during battering is improved and contact corrosion is eliminated;

d. axial stop systems such as O-rings are no longer necessary.

All types of grooves can be used, and the process according to the invention has numerous applications.

The axis of the grooves can be parallel to that of the inner shaft, which is the most common case, or can be disposed helically about the periphery of the shaft and have any pitch.

Figure 10:
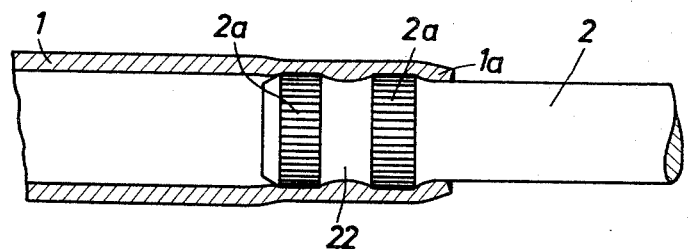
FIGS. 10 and 11 show two assemblies obtained at the ends of a tubular part and a shaft.

The grooves can be broken by one or more necks 22 (FIG. 10).

Figure 11:
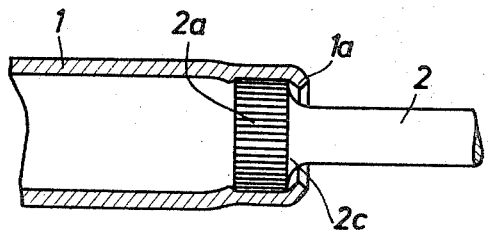

The grooves $2_a$ (FIG. 11) can be placed on a widening $2_c$ of the shaft 2 and be very short with respect to the outer diameter of the grooves.

Figure 12:
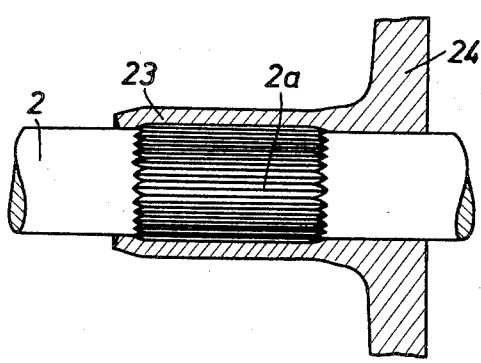
FIG. 12 shows an assembly formed with a tubular member of a part and an intermediate portion of a shaft provided with grooves.

Assembling can be carried out on any part of a shaft without its being necessary for the same to be expanded at this position. As an example, FIG. 12 shows a shaft 2 fixed at an intermediate position, in a socket 23 formed in a part 24.

Figure 13:
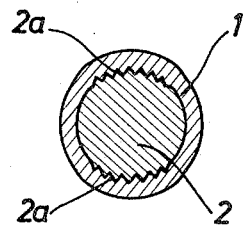
FIG. 13 represents a croos-section of an assembly of a tubular part and a shaft having grooves on two portions of the circumference thereof.

Furthermore, for instance, it is possible to obtain an assembly having grooves on two symmetrically opposite arcs of 90°, because, as is shown in FIG. 13, the grooves are not necessarily spaced regularly about the periphery of the inner part 2. Both their profile and their distribution may develop.

Figure 14:
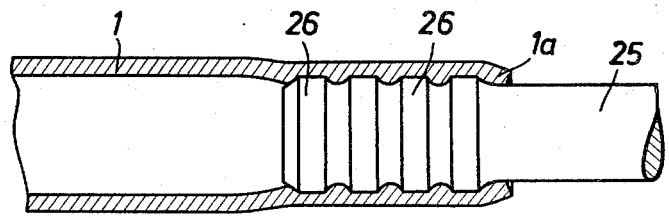
FIGS. 14 and 15 show special assemblies.

The grooves may all be circular at the end as is shown in FIG. 14, in which a shaft 25 comprises a series of circular grooves 25$_a$ which permits considerable tensile stresses to be exerted on the assembly so realized.

Figure 15:
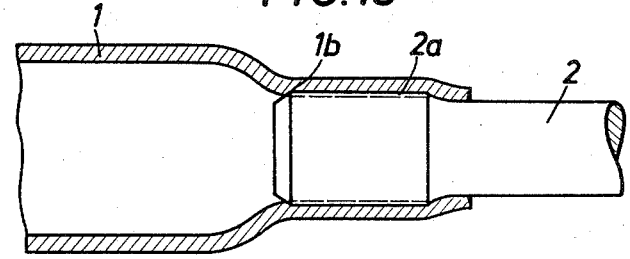

The assembly described can be combined with a previous swage 1$_b$ (FIG. 15) of tube 1 to be connected, bringing the interior of this tube to the required dimension for positioning the grooved shaft 2 before swaging of tube 1.

Figure 16:
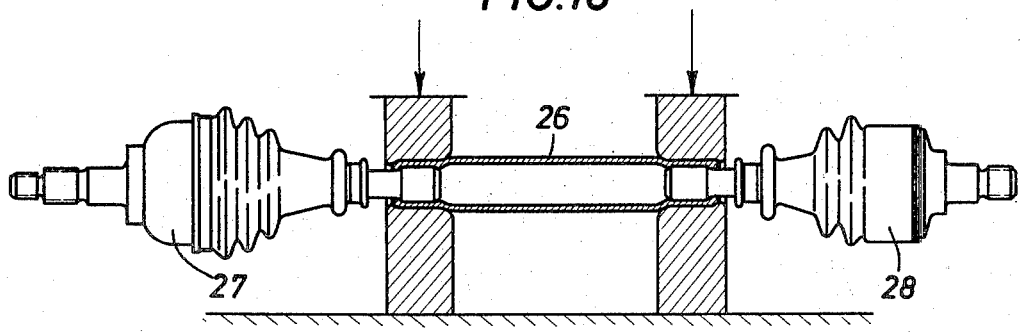
FIG. 16 represents the process which is the object of the invention used to adapt homokinetic joints to the ends of a transmission shaft.

Such an assembly permits the realisation for instance, of transmission shafts 26 (FIG. 16) provided, a both ends thereof, with homokinetic joints 27 and 28, with various lengths of tube as required quickly and without having to take the homokinetic joints apart. The only other preparation that tube 27 has to undergo before assembly is to be cut off to the required length for the application desired.

The assembly of one end of the shaft within a tube can thus be carried out, according to the invention, directly without alteration or modification of the basic diameters of this shaft, whereas in the known processes usually used it is necessary to widen the shaft and increase the diameter of the tube in order to provide the joint, carried out by welding or other processes, with a resistance sufficiently homogeneous with the basic resistance of the shaft and the tube to be connected.

As has already been stated, all types of grooves can by used for this method of coupling, however they may be obtained.

Such grooves can have straight or spreading flanks with variable angles of pressure and the modules considered suitable.

Figure 17:
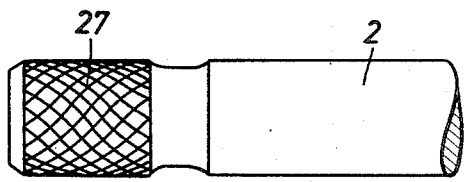
FIG. 17 shows a special form of groove provided on a shaft.

The grooves can be helical in the same direction or reversed, thus providing a sort of losange-shaped milling 27 (FIG. 17).

The circular grooves shown in FIG. 14 can be used alone or in combinations with any other grooves.

I claim:

1. Apparatus for assembling two parts into interlocked and interfitting relationship, the two parts including a first part having an externally grooved portion and a second part including a tubular portion of internal size to receive the externally grooved portion in closely spaced relation, the tubular portion being relatively soft as compared to the grooved portion for flowing under pressure into the grooves of the grooved portion, said apparatus comprising a plurality of similar jaws each having at least a concave inner surface, an outer surface and side surfaces adjacent said inner surface, said jaws being adapted to have the side surfaces thereof in contacting relation to limit inward movement of said jaws and said inner surfaces combining when said jaws are in their innermost positions to define a continuous tubular surface of a size and configuration to deform the tubular portion into complete interlock with the grooved portion, said jaws being arranged into two groups with one of said jaw groups containing at least one of said jaws and the other of said jaw groups containing two only of said jaws, pressure means for forcefully moving said two groups of jaws along a straight line path relative to each other from a first spaced position into said contacting relation, said pressure means being operable to move each jaw to apply a radially directed force on parts being joined, said pressure means including a force applying member engaging said jaws of said other jaw group and having first and second flat guiding surfaces, one of said guiding surfaces engaging the outer surface of a respective one of said two jaws, said first and second guiding surfaces being disposed at a selected angle to one another which angle is slightly less than a predetermined angle equal to the average internal angle of a geometric figure having a number of sides equal to the number of said jaws, the difference between said selected angle and said predetermined angle being in accordance with the sliding friction between said jaw outer surfaces and said guiding surfaces whereby the resultant force applied to each jaw is a radial force.

2. The apparatus of claim 1 wherein said one jaw group contains a single jaw.

3. The apparatus of claim 1 wherein said one jaw group contains but a single jaw, and said pressure means being operable to move said one jaw directly radially.

4. The apparatus of claim 1 wherein said one jaw group contains two jaws.

5. The apparatus of claim 1 wherein said one jaw group contains two jaws, and said pressure means includes a second force applying member opposing said first mentioned force applying member.

6. The apparatus of claim 1 wherein said one jaw group contains two jaws, and said pressure means includes a second force applying member opposing said first mentioned force applying member.

* * * * *